United States Patent
Morohashi

(10) Patent No.: US 8,014,611 B2
(45) Date of Patent: Sep. 6, 2011

(54) IMAGE COMPRESSION METHOD, IMAGE COMPRESSION DEVICE, IMAGE TRANSMISSION SYSTEM, DATA COMPRESSION PRE-PROCESSING APPARATUS, AND COMPUTER PROGRAM

(75) Inventor: Toshio Morohashi, Hyogo (JP)

(73) Assignee: TOA Corporation, Hyogo (JP)

( * ) Notice: Subject to any disclaimer, the term of this patent is extended or adjusted under 35 U.S.C. 154(b) by 898 days.

(21) Appl. No.: 10/590,149

(22) PCT Filed: Feb. 15, 2005

(86) PCT No.: PCT/JP2005/002237
§ 371 (c)(1),
(2), (4) Date: Aug. 21, 2006

(87) PCT Pub. No.: WO2005/081515
PCT Pub. Date: Sep. 1, 2005

(65) Prior Publication Data
US 2007/0183675 A1     Aug. 9, 2007

(30) Foreign Application Priority Data
Feb. 23, 2004 (JP) .................. 2004-046956

(51) Int. Cl.
*G06K 9/36* (2006.01)
(52) U.S. Cl. .................................. 382/232
(58) Field of Classification Search ........... 382/232
See application file for complete search history.

(56) References Cited

U.S. PATENT DOCUMENTS

| | | | |
|---|---|---|---|
| 5,333,212 A | 7/1994 | Ligtenberg | |
| 6,546,052 B1* | 4/2003 | Maeda et al. | 375/240.08 |
| 6,744,927 B1* | 6/2004 | Kato | 382/239 |
| 7,068,849 B2* | 6/2006 | Zandi et al. | 382/240 |
| 2001/0024242 A1 | 9/2001 | Takeuchi | |
| 2001/0048720 A1* | 12/2001 | Koshiba et al. | 375/240.16 |
| 2002/0141496 A1* | 10/2002 | Yang | 375/240.2 |
| 2002/0191694 A1* | 12/2002 | Ohyama et al. | 375/240.01 |
| 2004/0252903 A1* | 12/2004 | Chen et al. | 382/243 |
| 2005/0074062 A1* | 4/2005 | Sung et al. | 375/240.2 |
| 2005/0146610 A1* | 7/2005 | Creamer et al. | 348/207.1 |
| 2005/0175251 A1* | 8/2005 | Taketa et al. | 382/248 |

FOREIGN PATENT DOCUMENTS

JP    5-344346 A    12/1993
(Continued)

*Primary Examiner* — Brian P Werner
*Assistant Examiner* — Nirav G Patel
(74) *Attorney, Agent, or Firm* — Birch, Stewart, Kolasch & Birch, LLP

(57) ABSTRACT

An image compression apparatus and method capable of performing compression with different image qualities within an image. In a mosaic processing unit (16) of the image compression apparatus, a filtering region divider (130) divides input image data into a plurality of filtering areas and at least some of the filtering areas are subjected to unification processing for each of the filtering areas by a filtering unit (131). On the other hand, a JPEG encoder (17) divides the image data after the mosaic processing into a plurality of rectangular block areas and each of the block areas is subjected to DCT processing and quantization processing. Here, the filtering area consists of adjacent one or more sets of rectangular areas each consisting of two or more pixels obtained by equally dividing the aforementioned block area by 2n (n is a natural number).

18 Claims, 18 Drawing Sheets

FOREIGN PATENT DOCUMENTS

| | | |
|---|---|---|
| JP | 6-54310 A | 2/1994 |
| JP | 6-223174 A | 8/1994 |
| JP | 6-225153 A | 8/1994 |
| JP | 7-141492 A | 6/1995 |
| JP | 7-288806 A | 10/1995 |
| JP | 8-116430 A | 5/1996 |
| JP | 11-46361 A | 2/1999 |
| JP | 2001-230927 A | 8/2001 |
| JP | 2003-52036 A | 2/2003 |

* cited by examiner

[Fig. 1]
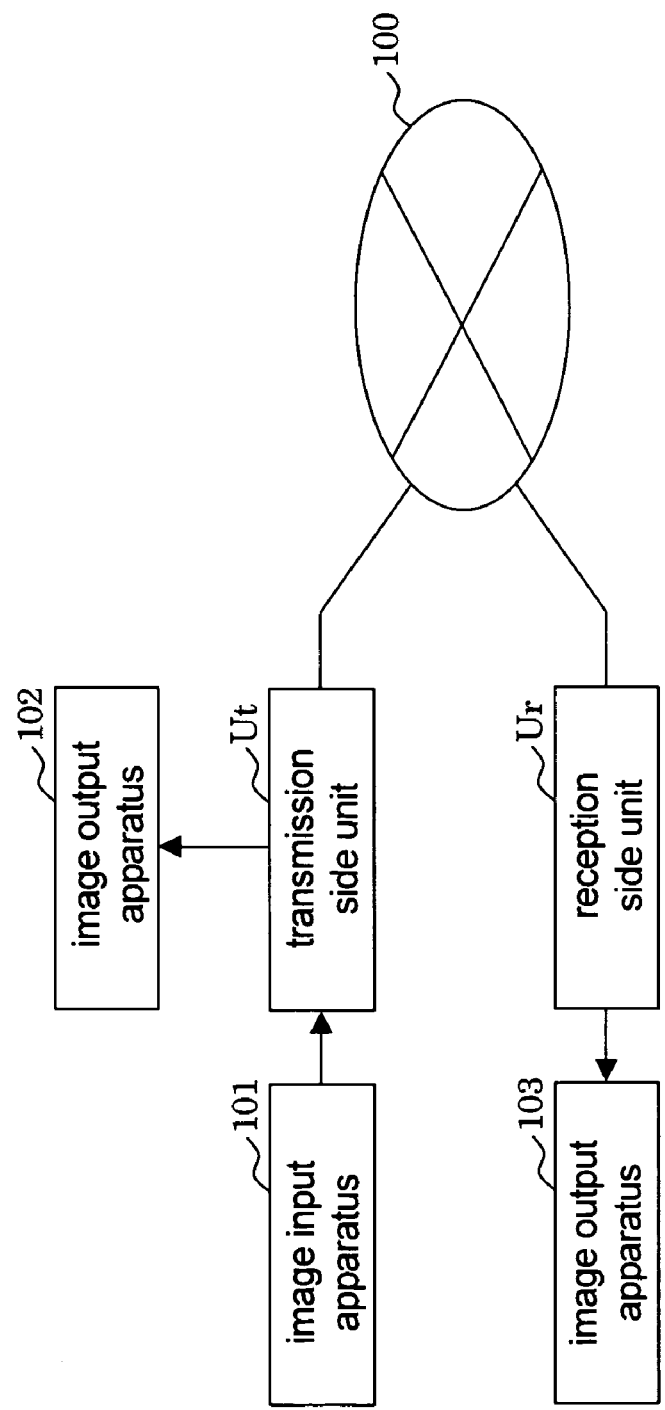

[Fig.2]
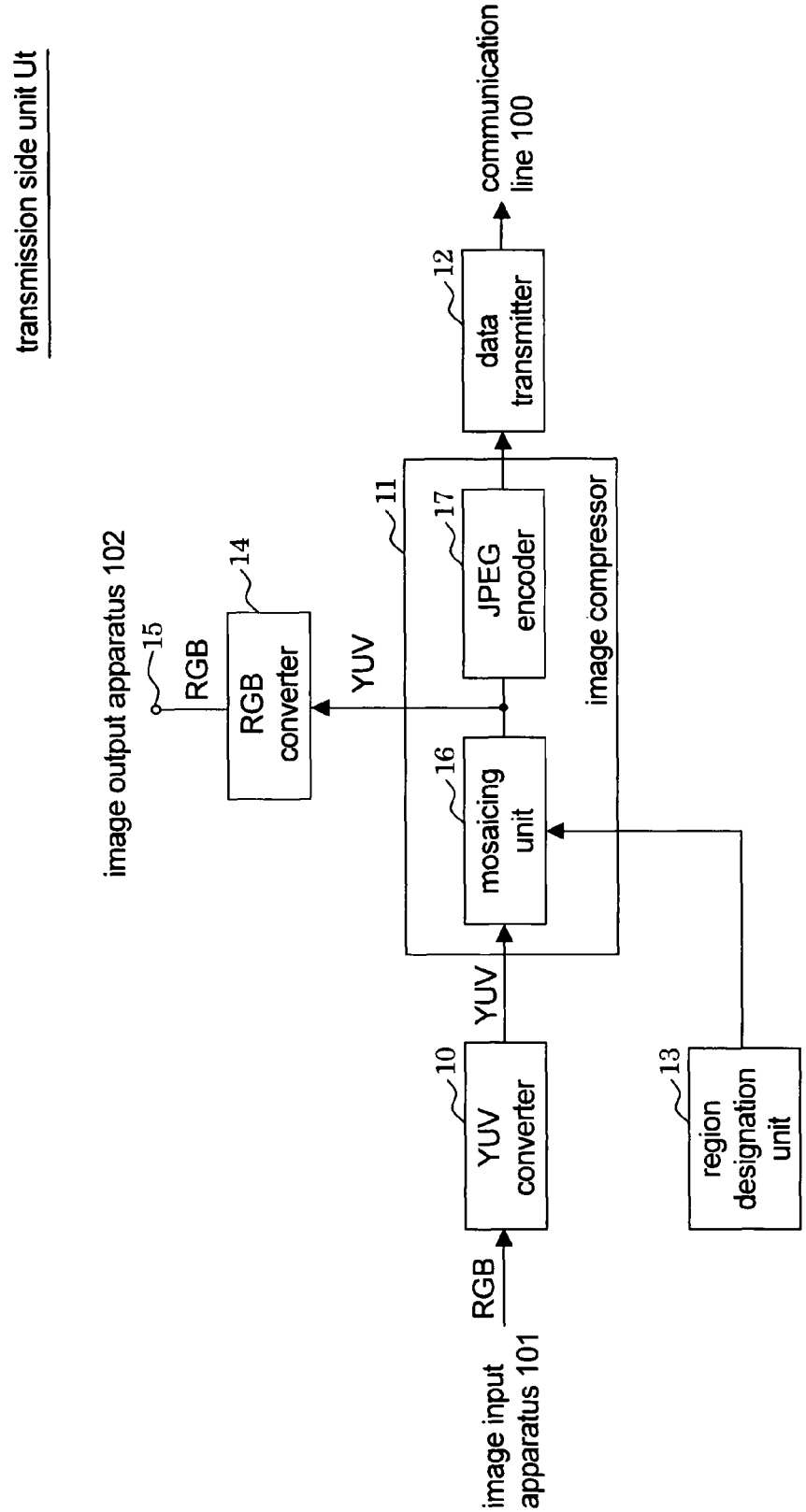

[Fig.3]
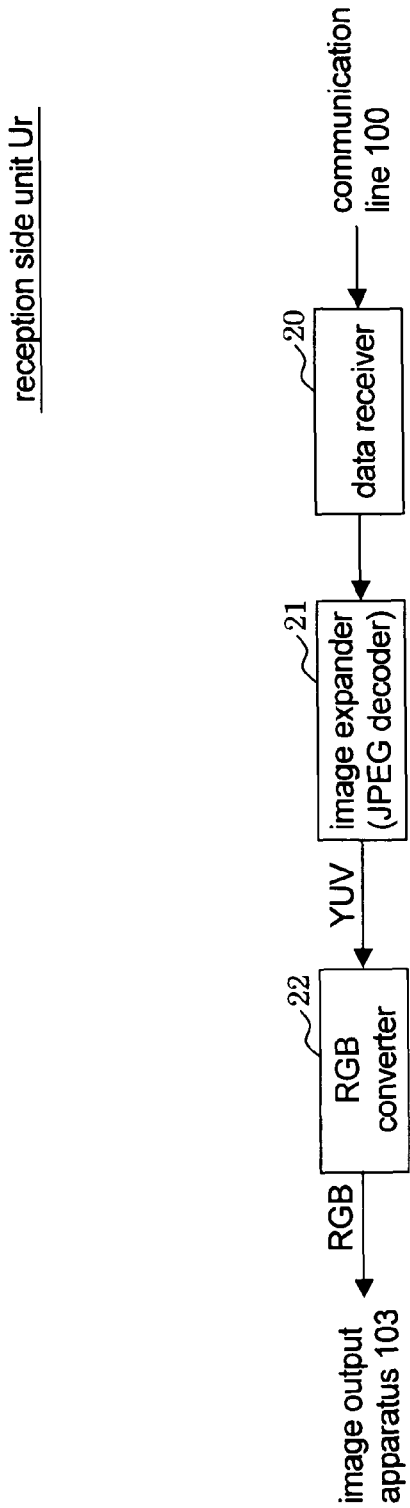

[Fig.4]
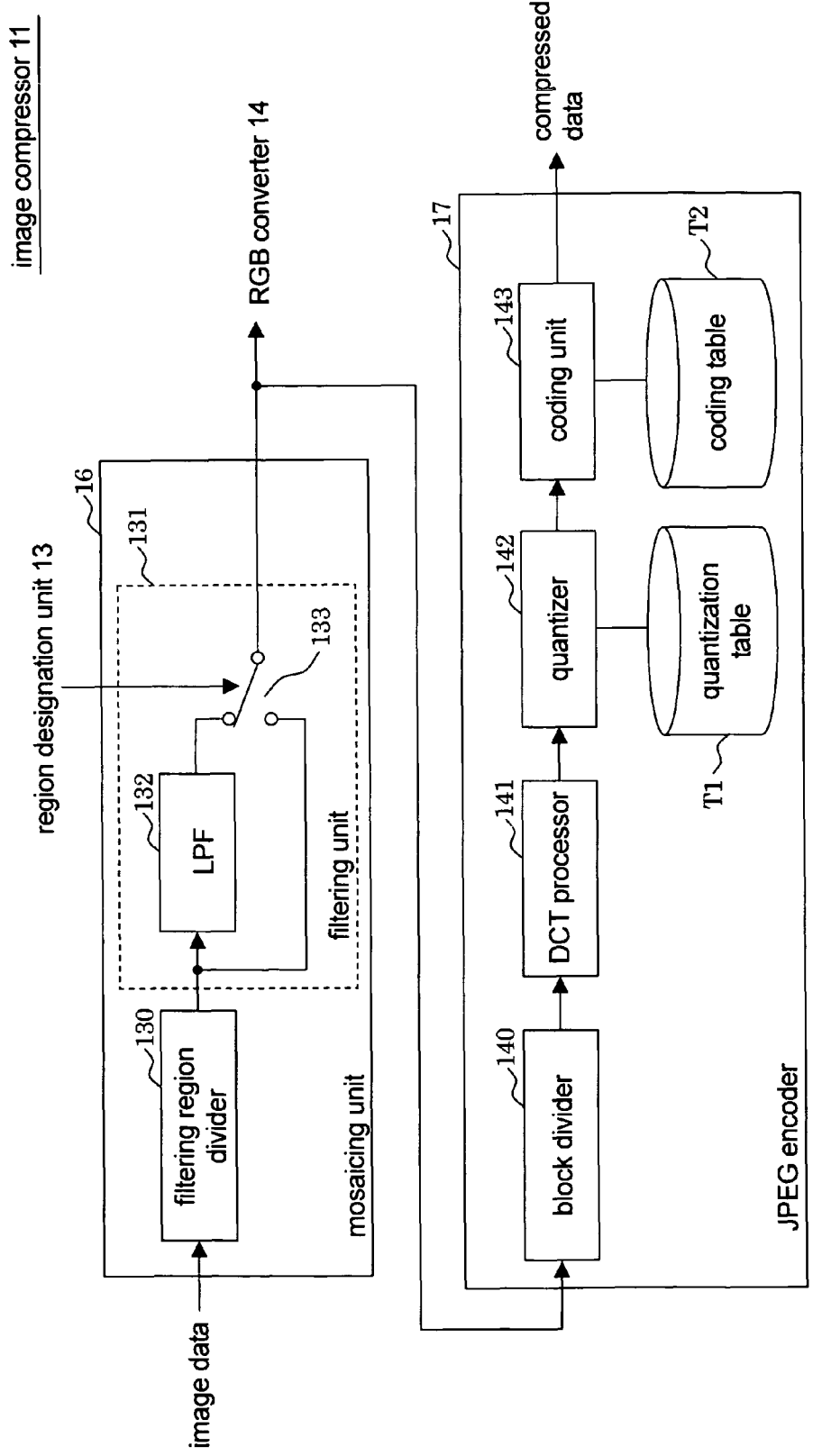

[Fig.5]
(a) before the mosaicing
(b) after the mosaicing
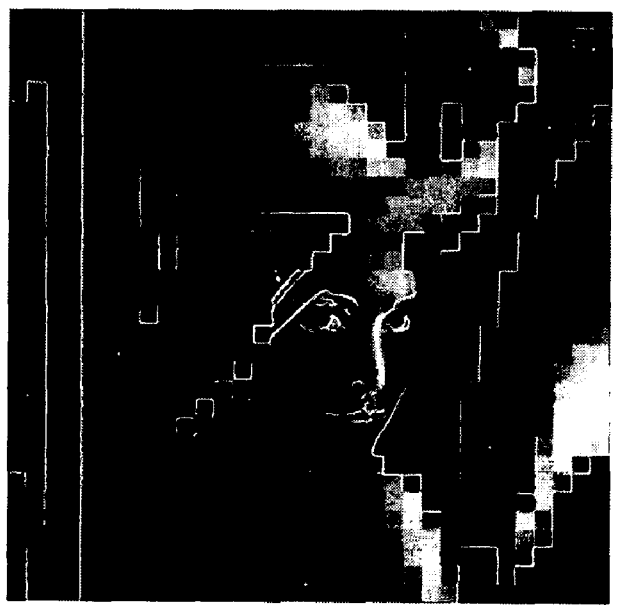

[Fig.6]

quantization table

→ horizontal frequency

| 16 | 11 | 10 | 16 | 24 | 40 | 51 | 60 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 50 | 87 | 80 | 62 |
| 18 | 22 | 37 | 59 | 68 | 109 | 103 | 78 |
| 24 | 35 | 55 | 64 | 81 | 104 | 113 | 92 |
| 49 | 64 | 78 | 87 | 103 | 121 | 119 | 101 |
| 72 | 92 | 95 | 98 | 112 | 100 | 103 | 99 |

↓ vertical frequency

[Fig.7]
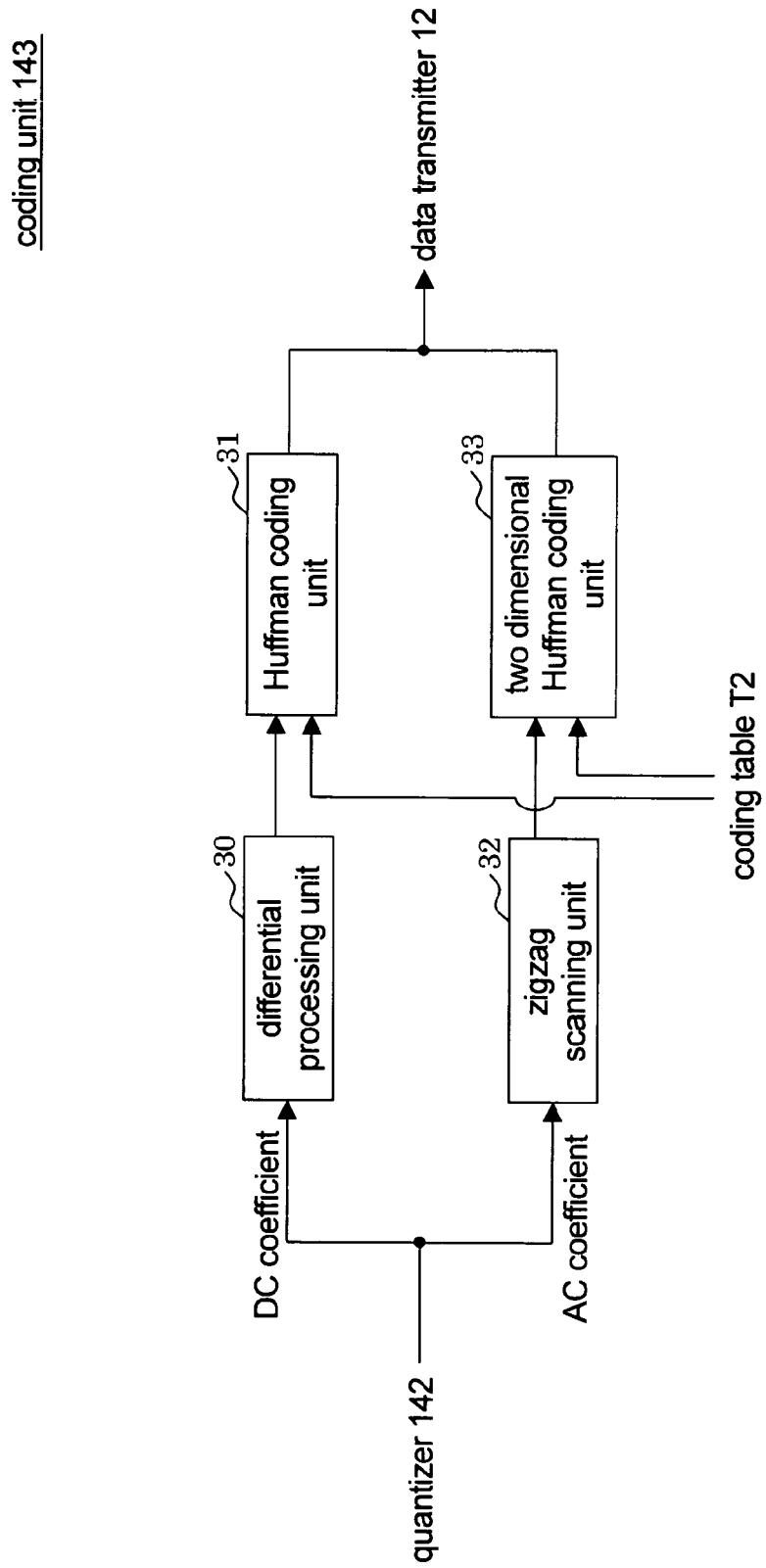

[Fig.8]

two dimensional Huffman code table (for AC coefficient)

| SSSS / RRRR | 0 | 1 | 2 | ... | 10 |
|---|---|---|---|---|---|
| 0 | 1010(EOB) | 00 | 01 | ... | 1111111110000011 |
| 1 | none | 1100 | 11011 | ... | 1111111110001000 |
| 2 | | 11100 | 111001 | ... | 1111111110001110 |
| ... | | ... | ... | ... | ... |
| 15 | 11111111001(ZRL) | 1111111110000101 | 1111111110000110 | ... | 1111111111111110 |

[Fig.9]
(a)
DCT coefficient
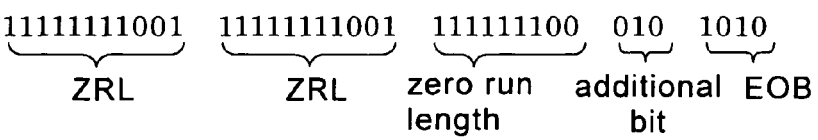
AC coefficient string : 0000000000000000 0000000000000000 0000001
Huffman code : 11111111001 11111111001 111111100 010 1010
　　　　　　　　ZRL　　　　　　ZRL　　　　zero run　additional　EOB
　　　　　　　　　　　　　　　　　　　　　length　　bit
(b)
DCT coefficient
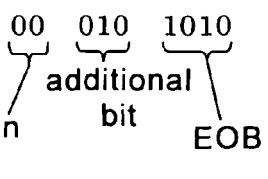
AC coefficient string : 1 0000···
Huffman code : 00 010 1010
　　　　　　　　　　　　additional
　　　　　　zero run　bit　　EOB
　　　　　　length

[Fig. 10]
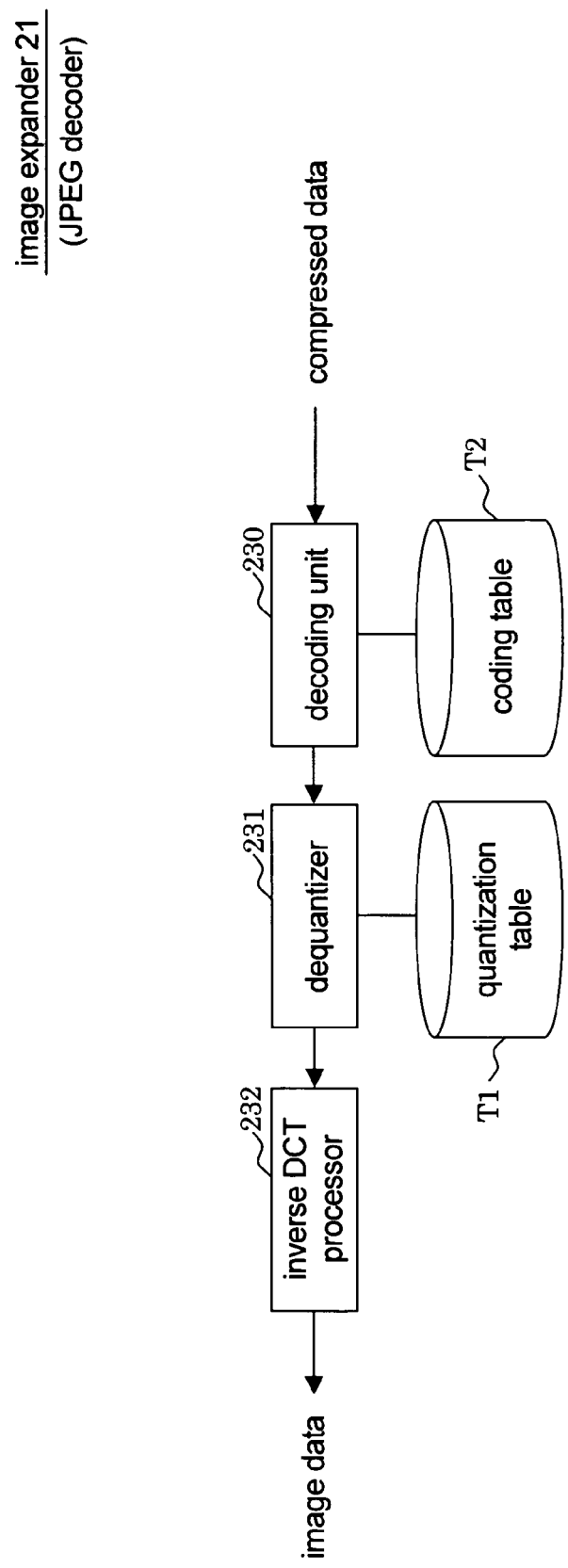

[Fig. 11]
(a) first embodiment
(b) comparison example 1
(c) comparison example 2
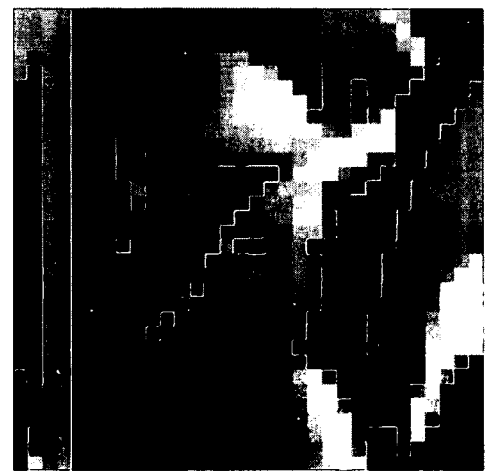

[Fig.12]
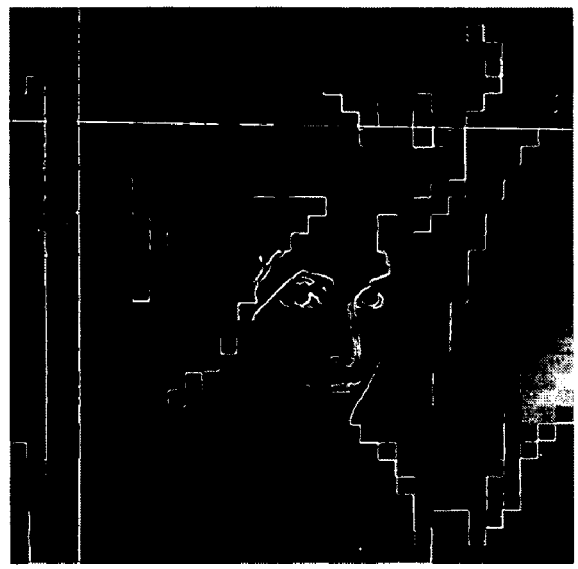
(a) first embodiment
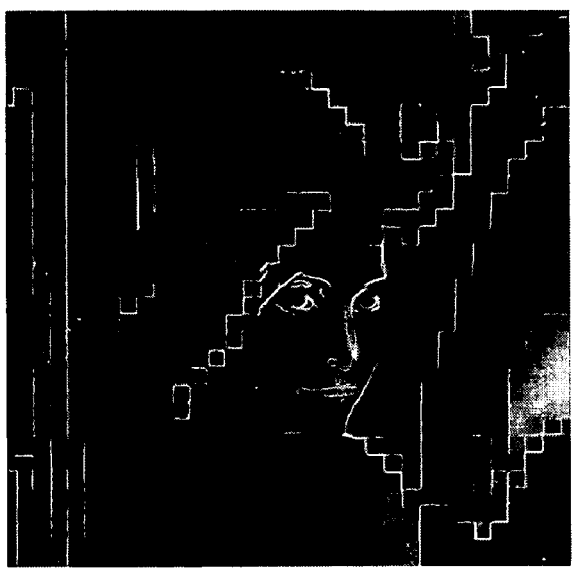
(b) comparison example

[Fig. 13]
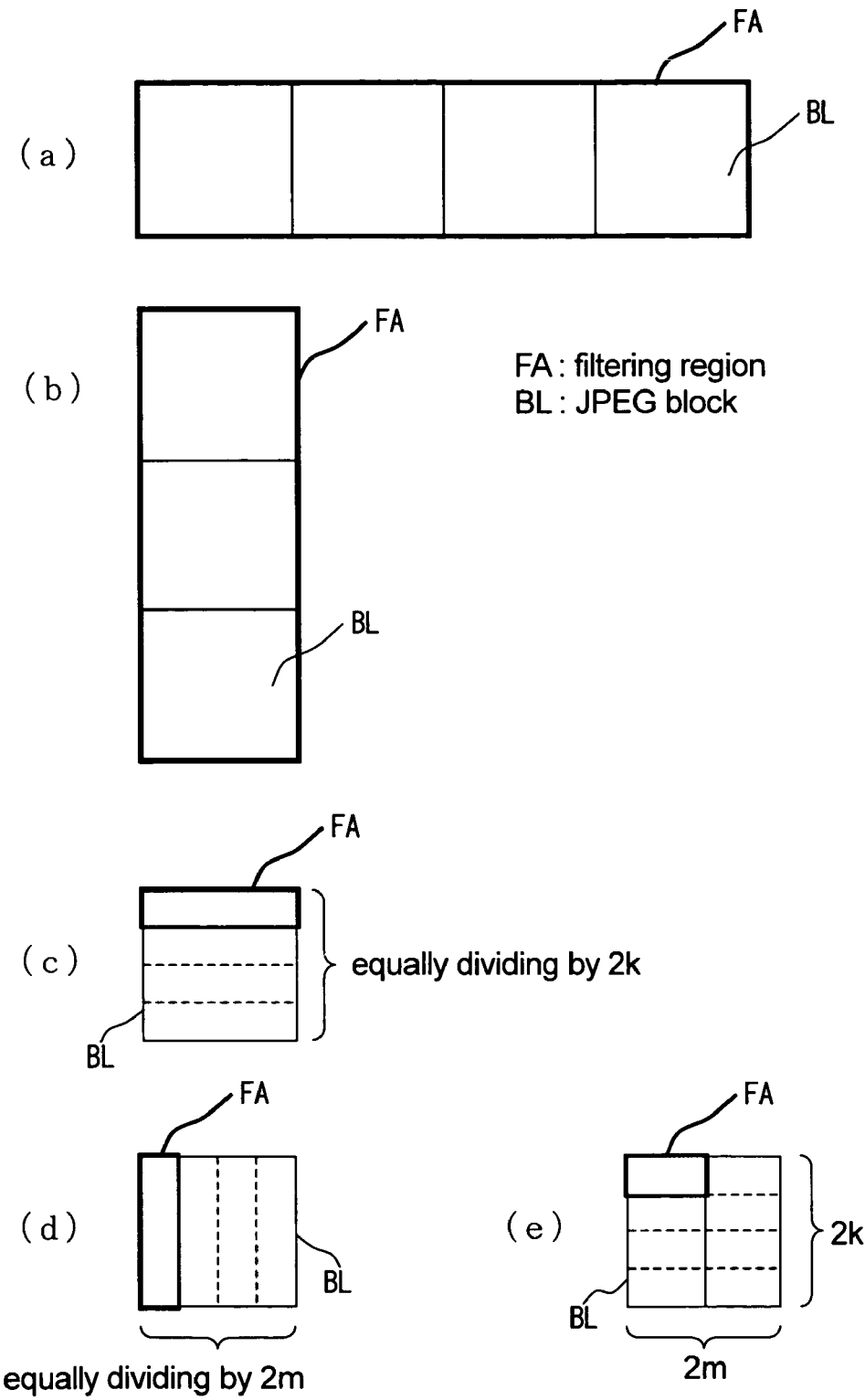

[Fig.14]
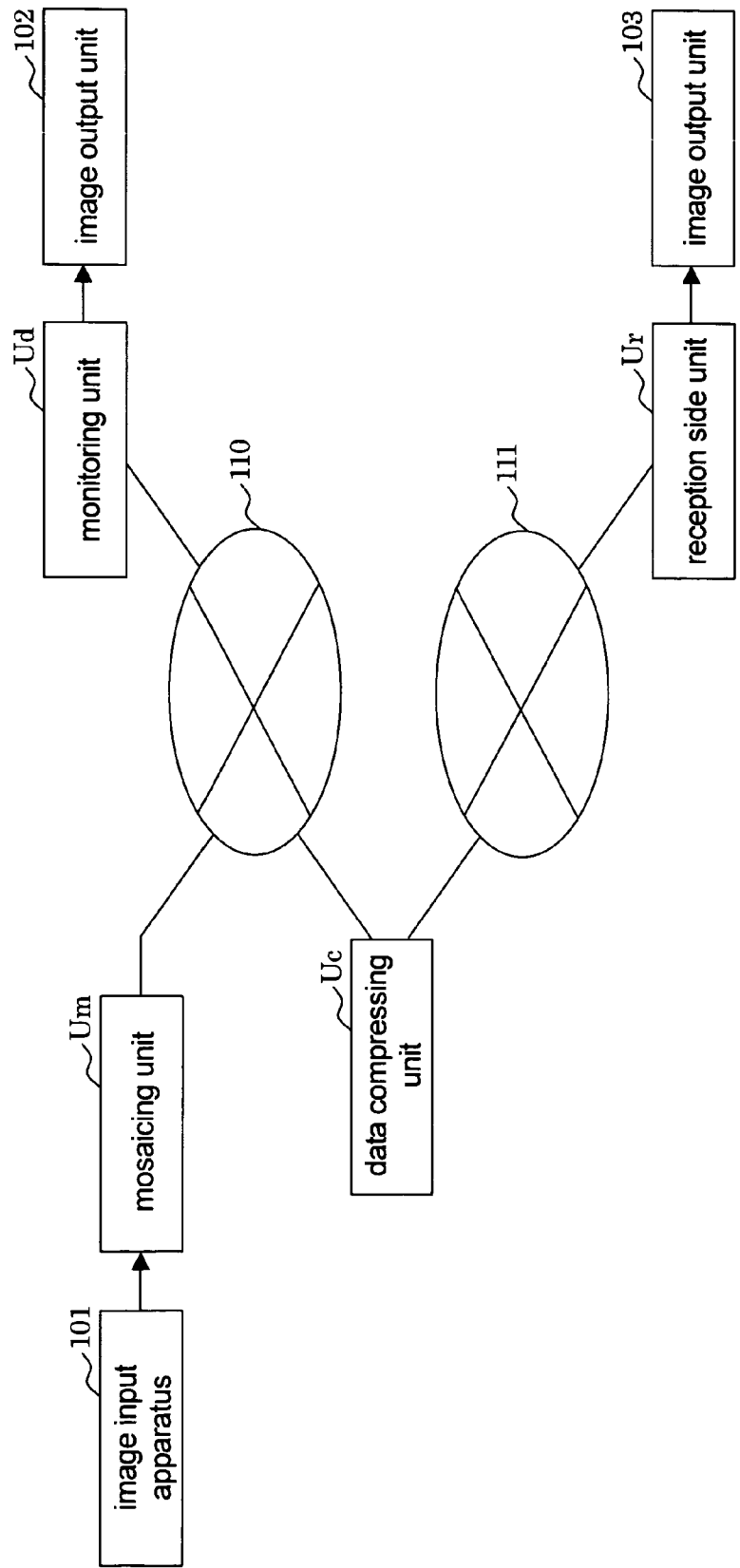

[Fig.15]
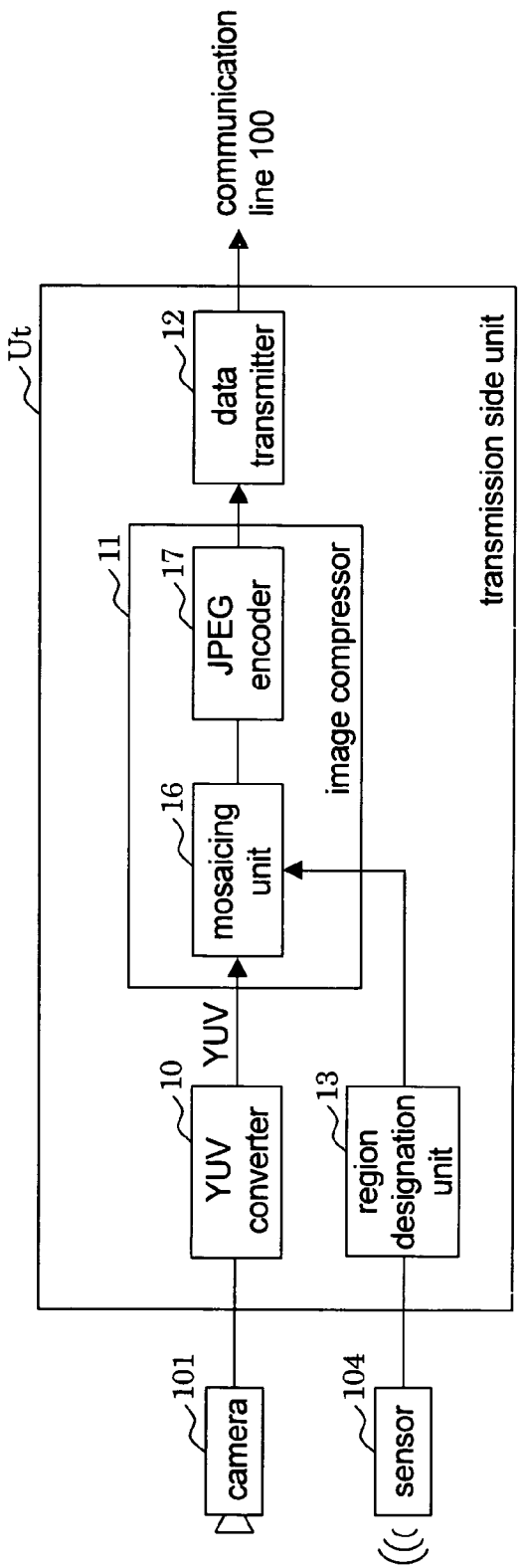

[Fig.16]
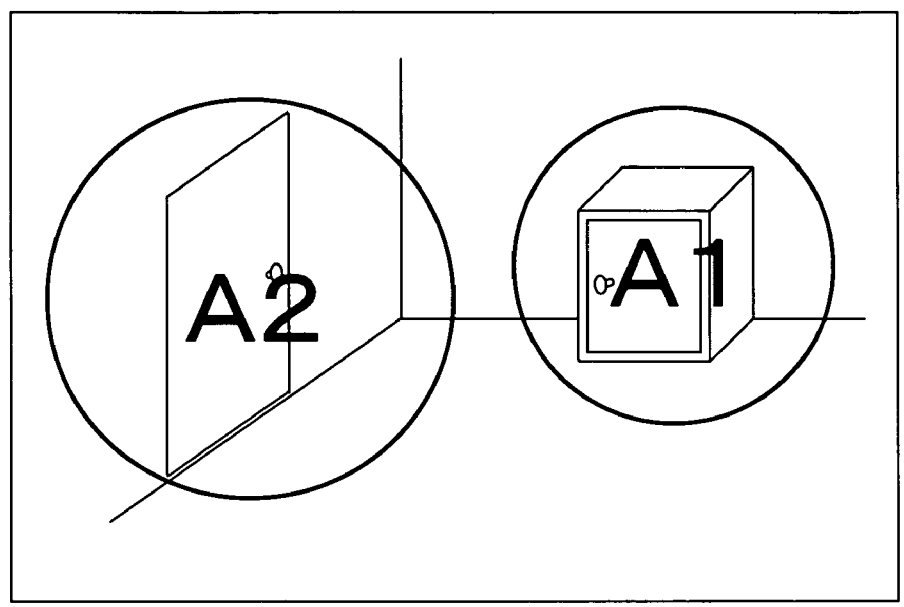

[Fig.17]
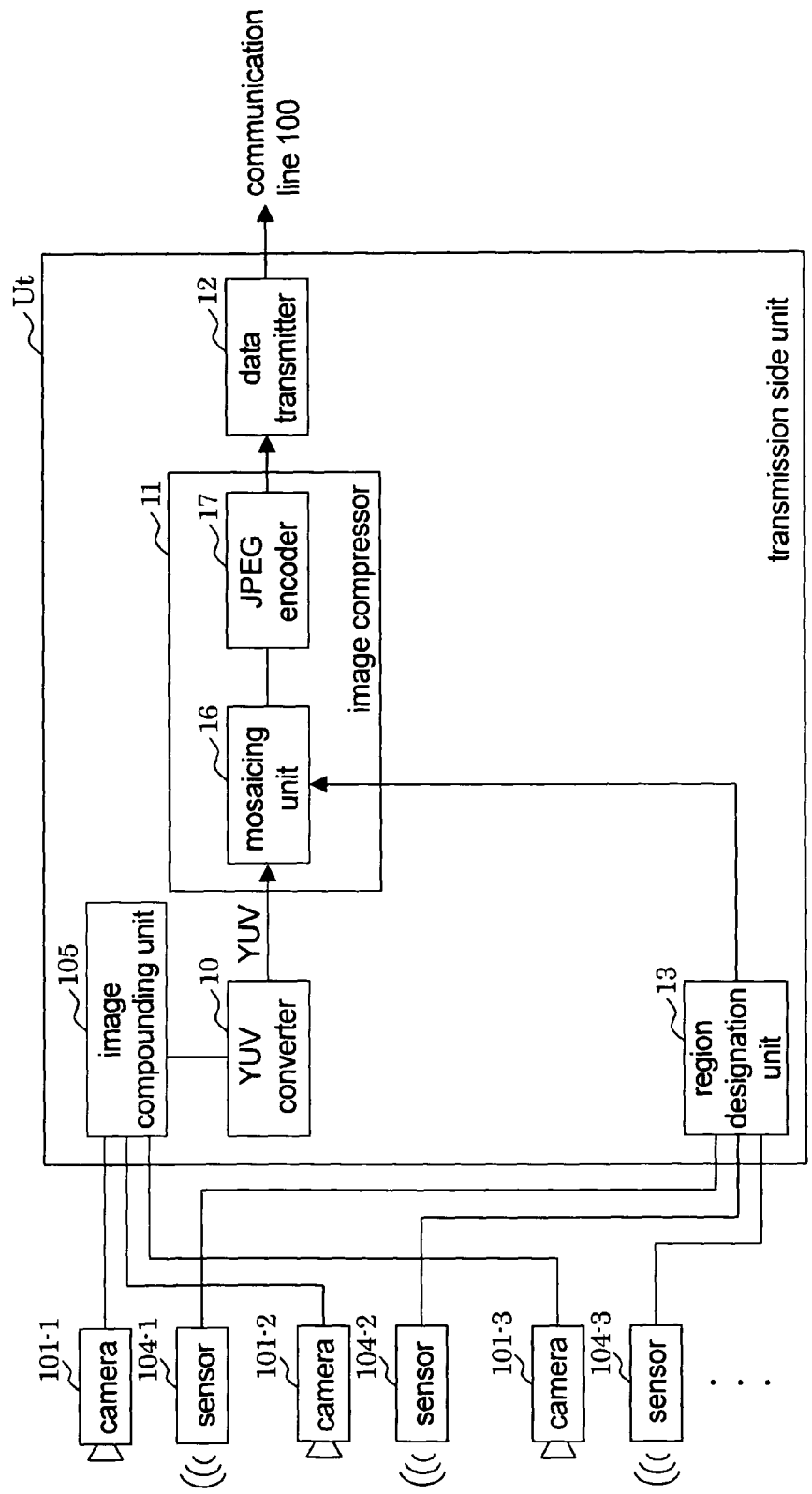

[Fig.18]
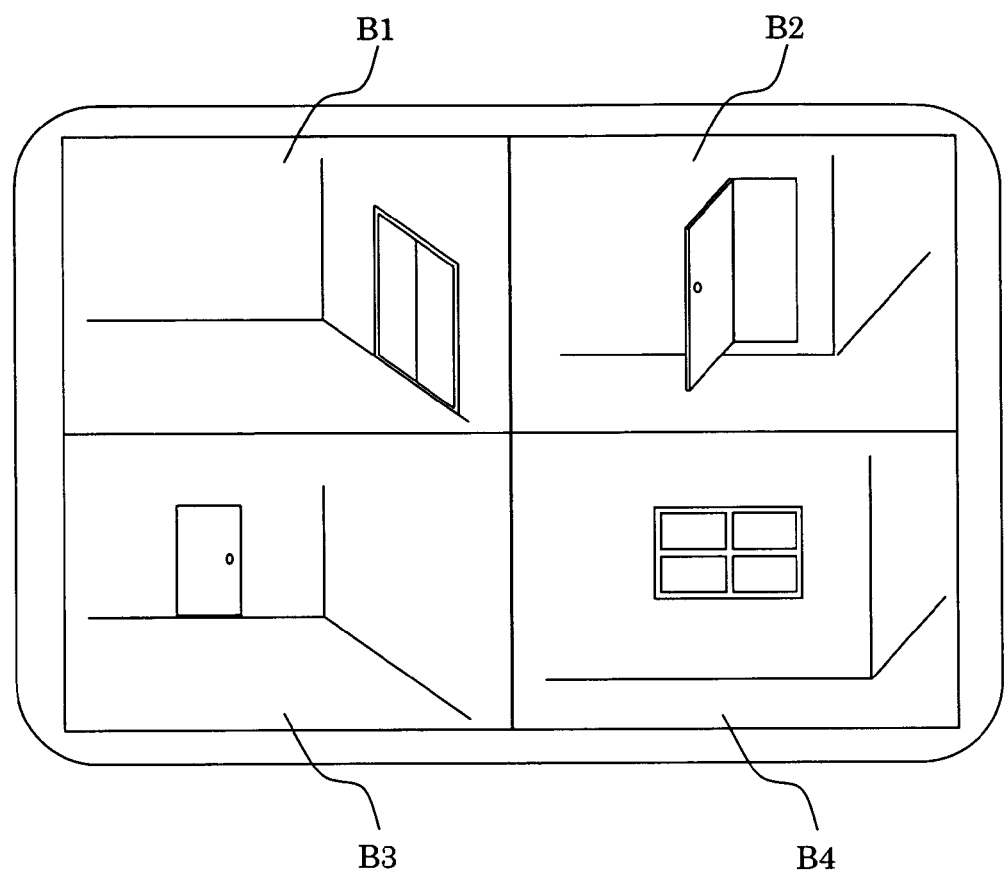

IMAGE COMPRESSION METHOD, IMAGE COMPRESSION DEVICE, IMAGE TRANSMISSION SYSTEM, DATA COMPRESSION PRE-PROCESSING APPARATUS, AND COMPUTER PROGRAM

TECHNICAL FIELD OF THE INVENTION

The present invention relates to an image compression method, an image compression apparatus, an image transmission system, a data compression preprocessing apparatus, and a computer program. More specifically, the present invention relates to an improvement of a data compression method such as a JPEG compression method for performing an orthogonal transform and a quantization on image data for every block region obtained by dividing the image data into a plurality of block regions.

BACKGROUND ART

As methods for compressing and expanding image data constituted by a still image, there are widely known JPEG (Joint Photographic Expert Group) standards standardized according to CCITT (International Telegraph and Telephone Consultative Committee) and ISO (International Standards Organization). In the JPEG standards, an image data compression method performed by dividing a frame image into a plurality of blocks in such a way that 8×8 pixels constitute one block, and transforming a spatial coordinate into a frequency coordinate, and an image data expansion method thereof are defined.

A data compressor according to the JPEG standards (hereinafter call "JPEG compressor") divides input image data into many blocks, and performs a DCT (Discrete Cosine Transform) processing and a quantization processing on each block. In this quantization processing, a value obtained by multiplying data specified for each DCT coefficient by a quantization table by a quantization factor Q is used as a quantization step width. The DCT coefficient obtained by the DCT processing is quantized by the quantization step width, thereby irreversibly reducing a data amount. Thereafter, entropy coding using a run-length processing, a differential processing, a Huffman coding processing or the like is performed, thereby generating compressed data. This coding is a processing for irreversibly reducing the data amount.

On the other hand, a data expander according to the JPEG standards (hereinafter call "JPEG expander") performs opposite processings to those performed by the JPEG compressor to restore compressed image data to original image data. Namely, input compressed image data is decoded and dequantized using the same quantization table and the same quantization factor Q as those used in the data compression. Thereafter, an inverse DCT processing unit performs an inverse DCT transform to combine the divided blocks, thereby restoring the compressed image data to the original image data.

To improve a data compression rate of the above-mentioned JPEG compressor, it is necessary to change the quantization table or the quantization factor Q so as to make the quantization step width larger. However, if a large data amount is reduced in the quantization processing, which is an irreversible processing, a quality of the restored image data is greatly degraded. In addition, this quality degradation occurs throughout the image. Due to this, even if an important region and an unimportant region are present in the image, an image quality is disadvantageously, uniformly degraded in the both regions.

To solve this problem, the applicant of the present application filed prior patent applications (identified as Japanese Patent Application No. 2003-43367, 2004-040643, and 2004-041212). These prior applications disclose a technique for dividing image data into a plurality of regions, and for downsampling the image data for a part of the regions as a preprocessing to a JPEG compression processing so as to degrade a quality of the image only for the unimportant region and to thereby reduce an amount of data that has been subjected to the JPEG compression processing. This downsampling is a processing for downsampling the image data in the regions to reduce the image data, and for inserting fill bits into the remaining portion of each of the regions.

Furthermore, to solve the above-mentioned problem, there is proposed, as a conventional technique, a compression processing method for making a quality of an image after restoration different among regions of the image (see, for example, Patent Document 1). The Patent Document 1 discloses an image compression apparatus that includes a mask circuit that masks a DCT coefficient before a quantization processing. This data compression apparatus makes a mask employed in the mask circuit different among the regions, thereby coding an image in the important region at a high image quality and coding the image in the unimportant region at a low image quality.

Patent Document 1: Japanese Unexamined Patent Publication No. 1994-054310

DISCLOSURE OF THE INVENTION

Problems to be Solved by the Invention

However, to restore the compressed data generated by the image compression apparatus disclosed in the prior applications to original data, it is necessary to perform an interpolation processing for returning a size of the image to an original size for the downsampled regions after performing a JPEG expansion processing. It is, therefore, disadvantageously necessary to employ not only the dedicated image compression apparatus but also a dedicated image expansion apparatus.

Furthermore, the image compression apparatus disclosed in the Patent Document 1 needs to perform a mask processing halfway along a DCT processing and a quantization processing that are performed sequentially during data compression. Due to this, a general-purpose JPEG compressor such as a JPEG chipset can not be employed as the data compression apparatus and the data compression apparatus is disadvantageously made expensive. Further, the mask processing is performed after the DCT processing. Due to this, even after the image data is divided into the important region and the unimportant region, it is disadvantageously required to hold the attributes of the respective regions, and to exercise a timing control for changing the masks in view of a DCT processing time based on the attributes. Besides, since the mask processing is a processing performed on each block, there is a limit to reduction of the data amount.

The present invention has been achieved in view of these circumstances. It is an object of the present invention to provide an image compression method and an image compression apparatus that can compress an image while making the image quality different among small regions within the image, and that can perform an expansion processing without using a dedicated image expansion apparatus. It is another object of the present invention to provide a data compression preprocessing apparatus that is used together with a general-purpose data compression apparatus, and that makes the image quality different among small regions within the image to improve a compression rate of the data compressor. It is also an object of the present invention to provide an image transmission system including the data compression preprocessing apparatus.

Means for Solving the Problems

An image compression method according to a first aspect of the present invention includes: a preprocessing step of preprocessing input image data; and a data compressing step of performing a data compression processing on preprocessed image data. The preprocessing step includes: a filtering region dividing step of dividing said input image data into a plurality of filtering regions; and a filtering step of attenuating a high frequency component of said input image data in at least one part of said filtering regions for each of said filtering regions. The data compressing step includes: a block region dividing step of dividing said preprocessed image data into a plurality of block regions, each shape of which is rectangular; an orthogonal transforming step of performing an orthogonal transform processing on said image data for each of said block regions; and a quantizing step of quantizing said image data that has been subjected to said orthogonal transform processing for each of said block regions. Each of said filtering regions is a cluster consisting of one or more adjacent rectangular regions, each of the rectangular regions being obtained by equally dividing each of said block regions by 2n (where n is a natural number) and each having a size of two or more pixels.

With this constitution, an image quality can be degraded for a part of the image at the preprocessing step, and a compression rate at the data compressing step can be improved. Due to this, it is possible to make the image quality different between the important region and the unimportant region within the image, and reduce the data amount after compression while maintaining the image quality of the important region high. In addition, at the preprocessing step that is a preprocessing to the compressing step, a processing for improving the compression rate at the data compressing step is realized. It is, therefore, possible to improve the compression efficiency without using a special data compressing step.

An image compression apparatus according to a second aspect of the present invention includes: preprocessing means for preprocessing input image data; and data compressing means for performing a data compression processing on preprocessed image data. The preprocessing means includes: filtering region dividing means for dividing said input image data into a plurality of filtering regions; and filtering means for attenuating a high frequency component of said image data in at least one part of said filtering regions for each of said filtering regions. The data compressing means includes: block region dividing means for dividing said preprocessed image data into a plurality of block regions, each shape of which is rectangular; orthogonal transforming means for performing an orthogonal transform processing on said image data for each of said block regions; and quantizing means for quantizing said image data that has been subjected to said orthogonal transform processing for each of said block regions. Each of said filtering regions is a cluster consisting of one or more adjacent rectangular regions, each of the rectangular regions being obtained by equally dividing each of said block regions by 2n (where n is a natural number) and each having a size of two or more pixels.

The image compression apparatus according to a third aspect of the present invention is constituted, in addition to the above-mentioned constitution, so that said filtering means performs a unifying processing for making pixel data within each of said filtering regions coincident with one another.

With this constitution, it is possible to effectively reduce the number of AC coefficients after the orthogonal transform for each of the filtered regions, and further improve the data compression rate of the data compressing means.

The image compression apparatus according to a fourth aspect of the present invention is constituted, in addition to the above-mentioned constitution, so that said filtering region dividing means divides said input image data into said filtering regions each at a size coincident with a size of each of said block regions. With this constitution, it is possible to effectively reduce the number of AC coefficients after the orthogonal transform for each of the filtered regions.

The image compression apparatus according to a fifth aspect of the present invention is constituted, in addition to the above-mentioned constitution, so that said data compressing means includes coding means for performing an entropy coding on a quantized DC coefficient based on a quantized DC coefficient of an adjacent block region, and so that said filtering region dividing means divides said input image data into said filtering regions each consisting of two or more adjacent block regions. With this constitution, it is possible to shorten the entropy code of the DC coefficient and further improve the compression rate of the data compressing means.

The image compression apparatus according to a sixth aspect of the present invention is constituted, in addition to the above-mentioned constitution, so that said filtering region dividing means divides said input image data into said filtering regions each smaller than each of said block regions. With this constitution, it is possible to reduce the number of AC coefficients after the orthogonal transform while suppressing a degradation in an image quality of each of the filtering regions.

The image compression apparatus according to a seventh aspect of the present invention is constituted, in addition to the above-mentioned constitution, so that said filtering region dividing means divides said input image data into said filtering regions of two or more types different in size. With this constitution, the image quality can be degraded within the image region step by step.

The image compression apparatus according to an eighth aspect of the present invention is constituted, in addition to the above-mentioned constitution, to include an image data output terminal for outputting said preprocessed image data. With this constitution, it is possible to monitor or store the image data after restoration without using data expanding means.

An image transmission system according to a ninth aspect of the present invention is an image transmission system in which a preprocessing apparatus is connected to a data compression apparatus through a first communication line, and in which said data compression apparatus is connected to a data expansion apparatus through a second communication line. The preprocessing apparatus includes: filtering region dividing means for dividing input image data into a plurality of filtering regions; filtering means for attenuating a high frequency component of said input image data by performing a filtering processing on at least one part of the filtering regions; and data transmitting means for transmitting said filtered image data to the first communication line. The data compression apparatus includes: block region dividing means for dividing the preprocessed image data into a plurality of block regions, each shape of which is rectangular; orthogonal transforming means for performing an orthogonal transform processing on said image data for each of said block regions; quantizing means for quantizing said image data that has been subjected to said orthogonal transform processing for each of said block regions; and data transmitting means for transmitting the encoded image data to said data expansion apparatus through the second communication line. Each of said filtering regions is a cluster consisting of one or more adjacent rectangular regions, each of the rectangular regions being obtained by equally dividing each of said block regions by 2n (where n is a natural number) and each having a size of two or more pixels.

The image transmission system according to a tenth aspect of the present invention is constituted, in addition to the above-mentioned constitution, to include an image display apparatus that is connected to the first communication line, and that displays the preprocessed image data. With this constitution, if the second communication line is smaller in bandwidth than the first communication line, for example, the image display apparatus that displays the preprocessed image data through the first communication line does not need to use data expanding means.

A data compression preprocessing apparatus according to an eleventh aspect of the present invention is a data compression preprocessing apparatus for preprocessing image data input to a data compression apparatus that divides said input image data into a plurality of block regions, each shape of which is rectangular, and that performs an orthogonal transform and a quantization on said input image data for each of said block regions. The data compression preprocessing apparatus includes: filtering region dividing means for dividing the input image data into a plurality of filtering regions; and filtering means for attenuating a high frequency component of said input image data in at least one part of the filtering regions for each of said filtering regions. Each of the filtering regions is a cluster consisting of one or more adjacent rectangular regions, each of the rectangular regions being obtained by equally dividing each of the block regions by 2n (where n is a natural number) and each having a size of two or more pixels.

A computer program according to a twelfth aspect of the present invention is a computer program for preprocessing image data input to a data compression apparatus that divides said input image data into a plurality of block regions, each shape of which is rectangular, and that performs an orthogonal transform and a quantization on said input image data for each of said block regions. The computer program includes procedures for executing: a filtering region dividing step of dividing said input image data into a plurality of filtering regions; and a filtering step of attenuating a high frequency component of said input image data in at least one part of said filtering regions for each of said filtering regions. Each of said filtering regions is a cluster consisting of one or more adjacent rectangular regions, each of the rectangular regions being obtained by equally dividing each of said block regions by 2n (where n is a natural number) and each having a size of two or more pixels.

Effect of the Invention

The present invention can provide an image compression method and an image compression apparatus that can compress an image while making an image quality different among small regions within the image, and that can perform an expansion processing without using a dedicated image expansion apparatus. The present invention can also provide a data compression preprocessing apparatus that is used together with a general-purpose data compression apparatus, that makes an image quality of an image different among small regions within the image, and that improve a data compression rate of the data compressor. Further, the present invention can provide an image transmission system including the data compression preprocessing apparatus.

BEST MODE FOR CARRYING OUT THE INVENTION

First Embodiment

Image Transmission System

FIG. 1 is a block diagram of one example of a configuration of an image compression and expansion system according to a first embodiment of the present invention and depicts an example of an image transmission system. This image transmission system includes a transmission side unit Ut and a reception side unit Ur connected to each other by a communication line 100. The image transmission system can compress image data and transmit the compressed image data from the transmission side unit Ut to the reception side unit Ur. In the present embodiment, image data of an image input apparatus 101 connected to the transmission side unit Ut is transmitted to an image output apparatus 103 connected to the reception side unit Ur. In addition, an image output apparatus 102 connected to the transmission side unit Ut can monitor the image data to be transmitted.

The communication line 100, which is constituted by a wired or wireless communication line for transmitting digital data, includes an exchange unit and/or a repeater unit if it is necessary to do so. For example, a packet communication network such as Ethernet®, the Internet or ATM (Asynchronous Transfer Mode) network, or the other digital network can be used as the communication line 100.

The image input apparatus 101, which is an apparatus that provides the image data, includes, for example, an imaging device such as a camera, an image reader such as a scanner, and a data storage device such as an HDD (Hard Disc Drive). In the present embodiment, the image input apparatus 101 is assumed to generate image data of the still image in an RGB format and to output the generated image data to the transmission side unit Ut. In the present specification, the still image means an image constituted by many pixels arranged two-dimensionally, and examples of the still image include a frame image of each frame and a differential image between frames that constitutes a moving image.

The image output apparatuses 102 and 103 are apparatuses that use the image data output from the transmission side unit Ut and the reception side unit Ur, respectively. Each of the image output apparatuses 102 and 103 includes, for example, a display such as an LCD, an image forming device such as a printer, and a data storage device such as an HDD (Hard Disc Drive). In the present embodiment, it is assumed that the image data on the still image in the RGB format is input to the image output apparatuses 102 and 103.

<Transmission Side Unit>

FIG. 2 is a block diagram of one example of a configuration of the transmission side unit Ut shown in FIG. 1. This transmission side unit Ut includes a YUV converter 10, an image compressor 11, a data transmitter 12, a region designating unit 13, an RGB converter 14, and an image output terminal 15. The image data generated by the image input apparatus 101 is converted first into image data in a YUV format by the YUV converter 10. After that, the resultant image data in the YUV format is mosaiced and compressed by the image compressor 11 into compressed data having a reduced data amount. This compressed data is transmitted to the communication line 100 by the data transmitter 12. In addition, the mosaiced image data is converted into image data in the RGB format by the RGB converter 14, and output to the image output apparatus 102 through the image output terminal 15.

The YUV converter 10 is format converting means for converting the image data in the RGB format into the image data in the YUV format (e.g., YUV410, 411, 420, 422 or 444 formats). If the image data in the YUV format is input from the image input apparatus 101 or the image compressor 11 compresses the image data in the RGB format, the YUV converter 10 is not included in the transmission side unit Ut.

The image compressor 11 includes a mosaicing unit 16 and a JPEG encoder 17. The mosaicing unit 16 divides an input image into many small regions, and attenuates a high frequency component of the image data to flatten the image data for at least a part of the small regions, thereby mosaicing the image data. The JPEG encoder 17 subjects the mosaiced image data to a compression processing according to the JPEG standards ("JPEG compression processing"), thereby generate the compressed data having the reduced data amount. Namely, the mosaicing is a preprocessing performed prior to an image data compression processing ("data compression preprocessing"). By performing such a preprocessing, the compression rate of the JPEG encoder 17 is improved.

The small regions subjected to be flattened by the mosaicing are determined according to image qualities required for the respective small regions. If an important region required to have a high image quality and an unimportant region that is not required to have the high image quality are present in the input image, only the small regions including the unimportant region are flattened. For instance, for the small regions including the important region, the input image data (raw data) is output from the mosaicing unit 16 without processing it. For the small regions that do not include the important region, the flattened data obtained by attenuating the high frequency component of the image data is output from the mosaicing unit 16.

The region designating unit 13 is means for designating the unimportant region subjected to be mosaiced. The image data is divided into the important region and the unimportant region by the region designating unit 13. The mosaicing unit 16 determines which small regions are subjected to be mosaiced based on an instruction from this region designating unit 13. The discrimination of the important region and the unimportant region in the input image is made in advance or designated by an operator. Alternatively, whether the region is the important region or the unimportant region may be discriminated based on a signal output from a sensor (not shown) or automatically discriminated based on image data. For instance, a region including a motion can be discriminated as the important region based on a result of a comparison among frames of the moving image. In addition, an image region that has relatively small change and that is flat can be discriminated as the unimportant region.

The RGB converter 14 converts the image data in the YUV format that has been mosaiced by the image compressor 11 into the image data in the RGB format, and outputs the image data in the RGB format to the image output terminal 15. If the image data in the YUV format is output to the image output apparatus 102 or the image compressor 11 compresses the image data in the RGB format, the RGB converter 13 is omitted. If the image data that has been mosaiced is not monitored, the RGB converter 14 and the image output terminal 15 are omitted.

<Reception Side Unit>

FIG. 3 is a block diagram of an example of one configuration of the reception side unit Ur shown in FIG. 1. This reception side unit Ur includes a data receiver 20, an image expander 21, and an RGB converter 22. The compressed data transmitted from the transmission side unit Ut to the communication line 100 is received by the data receiver 20. The received compressed data is expanded by the image expander 21 and restored to the image data in the YUV format. This image data is converted into image data in the RGB format by the RGB converter 22 and the image data in the RGB format is output to the image output apparatus 103.

The image expander 21 consists of a JPEG decoder. The compressed data from the data receiver 20 is subjected to an expansion processing according to the JPEG standards ("JPEG expansion processing") by the JPEG decoder, and restored to the image data that is not JPEG-compressed. Namely, the ordinary JPEG decoder restores the image data mosaiced by the transmission unit Ut to the original image data.

The RGB converter 22 converts the image data in the YUV format output from the image expander 21 into the image data in the RGB format, and outputs the image data in the RGB format to the image output apparatus 103. If the image data in the YUV format is input to the image output apparatus 103 or the image data in the RGB format is subjected to the JPEG compression without processing it, the RGB converter 22 is omitted.

<Image Compressor>

FIG. 4 is a block diagram of an example of one configuration of the image compressor 11 shown in FIG. 2 and depicts an example of detailed configurations of the mosaicing unit 16 and the JPEG encoder 17. The mosaicing unit 16 includes a filtering region divider 130 and a filtering unit 131.

[Filtering Region Divider]

The filtering region divider 130 divides the image data in the YUV format converted from the RGB format into a plurality of filtering regions. In the present embodiment, an instance in which each of the filtering regions is made coincident with the JPEG block, to be described later, will be described. Namely, an entire image region is divided into regions each at a size of 8×8 pixels with an upper left position of the image set as a reference position, and the divided regions are referred to as "filtering regions". The filtering region divider 130 outputs pixel data on pixels that constitute each filtering region to the filtering unit 131.

[Filtering Unit]

The filtering unit 131 includes a lowpass filter 132 and an output selector 133. The lowpass filter (LPF) 132 attenuates a high frequency component of the image data for each of the filtering regions divided by the filtering region divider 130, and generates flattened data in which each of the filtering regions is flattened.

Examples of a processing for attenuating the high frequency component include moving averaging, Gaussian filtering, and unifying. The moving averaging is a processing for calculating an average in a certain region (e.g., a region at a size of 3×3 pixels) centering around a target pixel, and for setting the average as data on the target pixel. The moving averaging is performed on all the pixels within each filtering region. The Gaussian filtering is a processing for applying a one-dimensional Gaussian filter to a horizontal direction of the image data, and for further applying the same filter to a vertical direction of the resultant data, thereby attenuating the high frequency component. The unifying is a processing for making all pieces of pixel data within each filtering region coincident. For instance, all pieces of the pixel data within each of the filtering regions are converted into an average among the filtering regions. If the filtering unit 131 performs such a unifying processing, each filtering region is converted into a single-color region.

The output selector 133 selects one of the flattened data generated by the LPF 132 and the raw data input from the filtering region divider 130, and outputs the selected data from the mosaicing unit 16. Namely, for the filtering regions including the important region, the raw data is output from the mosaicing unit 16 without filtering the raw data and for the filtering regions including the unimportant region, the flattened data that has been subjected to the filtering is output therefrom. The mosaiced data thus generated is output to the JPEG encoder 17 and the RGB converter 14.

FIG. 5 is photographs showing an example of the mosaicing. FIG. 5(a) depicts image data that is not subject to the mosaicing yet, and FIG. 5(b) depicts image data that has been subjected to the mosaicing. The image data shown in FIG. 5(b) is mosaiced while the region designating unit 13 designates, as the important region, a woman's face and its surroundings located almost in a central portion of the image region. Due to this, the woman's face that is the important region is clear, however, for the other or important region, each of the filtering regions at a size of 8×8 pixels is flattened, and only a schematic state can be grasped.

The image data shown in FIG. 5(a) and that shown in FIG. 5(b) are equal in the number of pixels. Therefore, the data amount is not reduced by the mosaicing, and the image data shown in FIG. 5(a) and that shown in FIG. 5(b) are equal in data amount at the moment the mosaicing is completed. However, the image data shown in FIG. 5(b) can be compressed at higher compression rate than that for the image data shown in FIG. 5(b) in the JPEG compression processing. Particularly, if the filtering region is made coincident with each JPEG block and the mosaicing is performed, it is possible to effectively improve the compression rate.

<JPEG Encoder>

The JPEG encoder 17 includes a block divider 140, a DCT processor 141, a quantizer 142, a coding unit 143, a quantization table T1, and a code table T2 (see FIG. 4). The image data output from the mosaicing unit 16 is divided into a plurality of rectangular blocks each at a size of 8×8 pixels by the block divider 140, with the upper left position of the image region set as a reference position. The DCT processor 141 performs a discrete cosine transform (DCT) on each of the divided blocks and obtains a DCT coefficient for each of the divided blocks. The respective DCT coefficients thus obtained are quantized by the quantizer 142 using the quantization table T1.

FIG. 6 is an example of the quantization table T1. Data for specifying quantization step widths is shown in a matrix for every frequency component in a horizontal direction and a vertical direction. This quantization table T1 includes data for making the quantization step width larger if the frequency is higher. At the time of quantizing each DCT coefficient, the quantization processor 142 reads data according to the DCT coefficient from the quantization table T1, multiplies the read data by the quantization factor (quantization coefficient) Q, and uses this multiplication result as the quantization step width for the DCT coefficient. This quantization factor Q is an arbitrary value for adjusting the compression rate and the image quality, and given in advance. If the quantization factor Q is made higher, then the quantization step width is increased, and the data compression rate can be improved. However, this is accompanied by generation of a block distortion and degradation of the image quality.

The coding unit 143 performs a coding processing on each quantized DCT coefficient using an entropy code. The entropy code is a coding scheme having a code length according to an appearance probability, and a Huffman code is widely known as the entropy code. The code table T2 holds a code table for the Huffman codes and the coding unit 143 performs the coding using this code table T2. Further, the coding unit 143 performs different coding between the DC coefficient and the AC coefficient.

FIG. 7 is a block diagram of one example of a configuration of the coding unit 143. This coding unit 143 includes a differential processing unit 30, a Huffman coding unit 31, a zigzag scanning unit 32, and a two-dimensional Huffman coding unit 33. The quantized DC coefficient is input to the differential processing unit 30. The differential processing unit 30 calculates a difference between the adjacent blocks. The Huffman coding unit 31 encodes this differential value. The Huffman coding unit 31 employs a code table in which a code length is smaller if a differential value is smaller. If the differential value is 0, the code length is the smallest.

On the other hand, the zigzag scanning unit 32 scans the quantized AC coefficients sequentially from a low frequency side to a high frequency side, thereby converting the AC coefficients into an AC coefficient string. This AC coefficient string is encoded by the two-dimensional Huffman coding unit 33. The two-dimensional Huffman coding unit 33 allocates a zero length code to the AC coefficient string based on a combination of a zero run length (RRRR) that is a length of continuous zero coefficients and a subsequent non-zero coefficient group (SSSS). Further, an additional bit for identifying the non-zero coefficients in the group is added to the zero length code.

FIG. 8 is an example of the two-dimensional Huffman code table used to code the AC coefficient string. In the two-dimensional Huffman code table, a vertical axis indicates the zero run length (RRRR) and a horizontal axis indicates the non-zero coefficient group (SSSS). The two-dimensional Huffman coding unit 33 encodes the AC coefficient string sequentially from a top based on the two-dimensional Huffman code table. At this time, the continuous zero coefficients are omitted from an end of the AC coefficient string and an EOB (End Of Block) is added to the end. The EOB is a code that indicates the end of the AC coefficient string. In addition, in this two-dimensional Huffman code table, zero run lengths exceeding 15 are not specified. If a zero run length equal to or more than 16 is present, a ZRL is used for every zero run length of 16.

FIG. 9 is an example of the AC coefficient coding. FIGS. 9(a) and 9(b) depict Huffman codes of JPEG blocks each consisting of one DC coefficient and one AC coefficient, respectively. In an AC coefficient string obtained by zigzag-scanning the JPEG blocks shown in FIG. 9(a), thirty eight zero-coefficients and a subsequent coefficient 1 are arranged. Due to this, the Huffman code of the AC coefficient string is 38-bit code consisting of two ZRLs, a zero length, additional bits, and an EOB. On the other hand, in an AC coefficient string obtained by zigzag-scanning the JPEG blocks shown in FIG. 9(b), a coefficient 1 is arranged first. Therefore, the Huffman code of the AC coefficient string is 9-bit code, which is far shorter than the Huffman code shown in FIG. 9(a).

That is, even if the number of non-zero coefficients is small in the AC coefficient string, the data amount can not be effectively reduced in the coding as long as a non-zero coefficient with high frequency is included in the string. Particularly if a zero run length larger than a largest zero run length code is present, it is required to use a ZRL, which makes the code longer. Due to this, the two-dimensional Huffman coding unit 33 can effectively reduce the data amount of each JPEG block from which the high frequency component is attenuated by the filtering unit 131. In case of the block that has been subjected to the unifying processing, in particular, if the AC coefficients are encoded, the code includes only the EOB and has a smallest code length.

<Image Expander>

FIG. 10 is a block diagram of an example of a configuration of the image expander 21 shown in FIG. 3. This image expander 21 is a JPEG decoder that includes a decoding unit 230, a dequantizer 231, an inverse DCT processor 232, a quantization table T1, and a code table T2. The image expander 21 performs inverse processings from those performed by the JPEG encoder 17 to expand the compressed data, and restores the compressed data to the image data before the JPEG compression. It is noted that the quantization table T1 and the code table T2 need to use the same data table as the one used in the JPEG encoder 17. The quantization table T1 and the code table T2 can be added to the compressed data if it is necessary to do so, and transmitted from the transmission side unit Ut to the reception side unit Ur.

<Comparative Evaluation>

FIG. 11 is photographs for comparatively evaluating the effect of the mosaicing according to the first embodiment. FIG. 11(a) depicts image data that has been subjected to the mosaicing according to the present embodiment, and a size of the image data after compression is 3.47 KB. If the mosaicing is not performed, the size of this image data after the compression is 12.3 KB. This, therefore, indicates that the size of the compressed image data is reduced to a one-third or less without degrading the image quality of the important region (near the face) in FIG. 11(a).

FIG. 11(b) depicts image data obtained by mosaicing the entire image by 4×4 pixels. In this case, despite its blurred entire image, the size of the image data after compression is 9.00 KB, which corresponds to a data amount twice or more as large as that of the image data shown in FIG. 11(a). FIG. 11(c) depicts image data obtained by mosaicing the entire image by 8×8 pixels. In this case, the size of the image data after compression is 2.54 KB, which is smaller than the size of the image data shown in FIG. 11(a). However, the entire image considerably gets blurred and a content of the image can not be discriminated.

FIG. 12 is photographs for comparative evaluation of the effect of the mosaicing according to the first embodiment. FIG. 12(a) depicts image data that has been subjected to the mosaicing according to the present embodiment. The image data is obtained by performing the unifying processing on the image while making each filtering block coincident with each JPEG block (8×8 pixels). FIG. 12(b) depicts image data obtained by performing the unifying processing on the image similarly to FIG. 12(a) while shifting each filtering block by four pixels from the JPEG block at a size of 8×8 pixels. In this case, the size of the image data after compression is 11.0 KB, and the image quality of this image data is almost equal to that shown in FIG. 12(a). However, the data size after the compression is closer to that of the image data that has not been subjected to the mosaicing.

According to the present embodiment, the mosaicing unit 16 of the transmission side unit Ut divides the entire image region into the filtering regions, and flattens only the filtering regions designated as the unimportant region by the region designating unit 13. It is, therefore, possible to make the image quality different between the important region and the unimportant region in the same image, and reduce the data amount after the JPEG compression. Namely, the data amount can be reduced without degrading the image quality of the important region.

Furthermore, the mosaicing unit 16 makes a filtering region coincident with the JPEG block. Therefore, if the pixel data is flattened for each of the filtering regions in the filtering, the compression rate can be effectively improved in the JPEG compression.

Moreover, the image compressor 11 performs the mosaicing as the preprocessing to the JPEG compression processing, so that the compression rate is improved as compared with the instance of performing only the JPEG compression processing. In other words, while no special processing is added to a series of processings performed by the JPEG encoder 17, and the data in the same format as that according to the conventional technique is input to the JPEG encoder, the compression rate of the JPEG encoder 17 is improved. Therefore, a general-purpose JPEG compressor such as a JPEG chip or a PC add-on board can be employed as the JPEG encoder 17 as it is. Accordingly, the JPEG encoder 17 can be realized at low cost.

Further, if the image data is restored in the reception side unit Ur, it suffices to perform only the JPEG expansion processing without other special processings. Besides, the transmission side unit Ut can monitor the image data transmitted to the reception side unit Ur, i.e., the mosaiced image data without performing the JPEG expansion processing.

Second Embodiment

In the first embodiment, the instance of making a filtering region coincide with the JPEG block has been described. In the present embodiment, by contrast, an instance in which the filtering region differs in size and shape from the JPEG block will be described.

FIGS. 13(a) to 13(e) depict an example of a relationship between the filtering region and the JPEG block that will be described below. In FIG. 13, a reference symbol FA denotes the filtering region and a reference symbol BL denotes the JPEG block.

An instance in which the filtering region is larger than the JPEG block will first be described. A filtering region is assumed as a cluster consisting of two or more adjacent JPEG blocks, and the filtering region is subjected to the unifying. In this case, the DC coefficient for each of the JPEG blocks obtained by the DCT processing performed within the JPEG encoder 17 is equal. Due to this, if these JPEG blocks are adjacent to one another in a processing direction of the JPEG encoder 17, then the difference between the DC coefficients calculated by the differential processing unit 30 within the coding unit 143 can be made 0, and the code length of the coded DC coefficient can be made smallest.

Generally, the processing within the JPEG encoder 17 is started at the upper left position of the image data and the processing position is sequentially moved from left to right in the horizontal direction. If the processing is completed up to a right end of the image data, then the processing target is shifted to a downward direction, and the same processing is repeatedly performed on the region located right under the processed region. Therefore, as shown in FIG. 13(a), by defining a region consisting of two or more JPEG blocks adjacent to one another horizontally as a filtering region, it is possible to further shorten the code length of the DC coefficient generated by the coding unit 143, and further improve the data compression rate.

Furthermore, as shown in FIG. 13(b), if a region consisting of two or more JPEG blocks adjacent to one another vertically is defined as the filtering region and the unifying is performed on the filtering region, the compression rate during the JPEG compression is equal to that if the filtering region is made coincident with the JPEG block. Namely, even if the filtering region is enlarged in the vertical direction, the compression rate can not be further improved.

An instance in which a filtering region is smaller than the JPEG block will be described. As shown in FIG. 13(c), regions obtained by equally dividing the JPEG block by 2k (where k is a natural number) in the vertical direction are defined as the filtering regions, respectively, and the unifying is performed on each of the filtering regions. In this case, the number of AC coefficients in the vertical direction obtained by the DCT processing performed on the JPEG block within the JPEG encoder 17 is up to k. Therefore, the number of the AC coefficients in the vertical direction can be suppressed to be equal to or smaller than k.

Exactly the same processing is performed for the horizontal direction. Namely, as shown in FIG. 13(d), regions obtained by equally dividing the JPEG block by 2m (where m is a natural number) in the horizontal direction are defined as the filtering regions, respectively, and the unifying is performed on each of the filtering regions. In this case, the number of AC coefficients in the horizontal direction obtained by the DCT processing performed on the JPEG block within the JPEG encoder 17 is up to m. Therefore, the number of the AC coefficients in the horizontal direction can be suppressed to be equal to or smaller than m.

Furthermore, as shown in FIG. 13(e), regions obtained by equally dividing the JPEG block by 2k in the vertical direction and by 2m in the horizontal direction are defined as the filtering regions, respectively, and the unifying is performed on each filtering region. In this case, the number of AC coefficients obtained by the DCT processing performed on the JPEG block within the JPEG encoder 17 is up to k×m. Therefore, the number of the AC coefficients can be suppressed to be equal to or smaller than k×m.

Since the JPEG block is rectangular, the JPEG block is divided either horizontally or vertically so as to equally divide the JPEG block into 2n rectangular regions. For this reason, each of the filtering regions shown in FIGS. 13(c) to 13(e) can be paraphrased as "a filtering region consisting of rectangular regions obtained by equally dividing the JPEG block by 2n (where n is a natural number)". However, if the size of each of the filtering regions is smaller than 2 pixels, it is of no significance to perform the unifying on each of the filtering regions. Needless to say, therefore, it is necessary that the number of pixels of each of the filtering regions is equal to or greater than 2.

In sum the above description, if the filtering region is a cluster consisting of one or more adjacent rectangular regions obtained by equally dividing the JPEG block by 2n (where n is a natural number) and each having two or more pixels, the compression rate during the JPEG compression processing can be improved. In addition, the filtering region is not limited to the rectangular region and may be either smaller than or larger than each of the JPEG blocks.

In the above-mentioned embodiment, the instance in which the image region is divided into the filtering regions equal in size and shape has been described. Alternatively, the filtering regions may be a mixture of two or more types of filtering regions different in either size or shape. In this case, the region designating unit 13 designates the shape and the size of each of the filtering regions, and the filtering region divider 130 and the filtering unit 131 divide the image region into the filtering regions based on the designation and perform the filtering.

Third Embodiment

FIG. 14 is a block diagram of an example of an image transmission system according to a third embodiment of the present invention. This image transmission system includes a mosaicing unit Um, a monitoring unit Ud, a data compressing unit Uc connected to one another through a first communication line 110, and a reception side unit Ur connected to the data compressing unit Uc through a second communication line 111.

An image input apparatus 101 is connected to the mosaicing unit Um, mosaics image data from the image input apparatus 101 and transmits the mosaiced image data to the first communication line 110 without performing the data compression processing on the mosaiced image data. An image output apparatus 102 is connected to the monitoring unit Ud. If the monitoring unit Ud receives the mosaiced image data from the mosaicing unit Um, the monitoring unit Ud converts the image data into the image data in the RGB format and causes the resultant image to be displayed on the image output apparatus 102 for monitoring.

The data compressing unit Uc subjects the compressed data received from the mosaicing unit Um through the first communication line 110 to a JPEG compression processing, and transmits the JPEG-compressed image data to the second communication line 111. An image output apparatus 103 is connected to the reception side unit Ur. The reception side unit Ur subjects the compressed data received from the data compressing unit Uc through the second communication line 111 to the JPEG expansion processing, converts the image data into image data in the RGB format, and outputs the image data in the RGB format to the image output apparatus 103.

Such an image transmission system is suitable if the second communication line 111 is smaller in transmission bandwidth than the first communication line 110. The monitoring unit Ud can monitor or store the image data compressed and transmitted through the second communication line 111 without performing the JPEG expansion processing.

Fourth Embodiment

In a fourth embodiment, an instance in which the region designating unit 13 automatically discriminates whether a region is the important region or the unimportant region will be described.

FIG. 15 is a block diagram of an example of a configuration of an important element of an image transmission system according to the fourth embodiment of the present invention. FIG. 15 depicts a transmission side unit Ut to which a monitoring camera 101 and a sensor 104 are connected.

The monitoring camera 101 picks up the still image and outputs picked-up image data to the transmission side unit Ut. For the sake of convenience, the RGB converter 14 and the image output terminal 15 are not shown in the configuration of the transmission side unit Ut. However, the transmission side unit Ut is equal in configuration to that shown in FIG. 2. As the sensor 104, a distance measuring sensor using an ultrasonic wave or an infrared ray, a voice sensor such as a microphone, an opening-closing sensor that detects a door opening-closing operation or the other sensors are used. The sensor 104 mainly detects a moving object such as a human body or a vehicle within a pickup range of the monitoring camera 101 or in its surroundings. A detection signal from the sensor 104 is input to the region designating unit 13 of the transmission side unit Ut, and the region designating unit 13 discriminates whether the region is the important region or the unimportant region based on this detection signal.

FIG. 16 depicts image data from the monitoring camera 101. Regions A1 and A2 within this image range are set in advance. It is assumed herein that an image region that includes a target (e.g., a safety box) to be monitored continuously is the region A1, and that an image region near the door to be monitored only if the door is opened or closed is the region A2. The sensor 104 is assumed as the door opening-closing sensor.

The region designating unit 13 designates only the region A1 as the important region if no detection signal is output from the sensor 104. In this case, the mosaicing unit 16 filters the region other than the region A1, that is, the unimportant region including the region A2, and subjects the image data in this region to mosaicing. On the other hand, if the detection signal is output from the sensor 104, the region designating unit 13 designates only the region A2 as the important region. Namely, the region designating unit 13 designates one of the two different regions A1 and A2 as the important regions based on the output from the sensor.

As another operation example, if the detection signal is output from the sensor 104, the region designating unit 13 may designate both the regions A1 and A2 as the important regions. In this case, the region A1 is always designated as the important region, regions other than the regions A1 and A2 are always designated as the unimportant regions, and about only the region A2, the region designating unit 13 discriminates whether or not the region A2 is the important region based on the detection signal from the sensor 104.

As yet another operation example, if the regions A1 and A2 are not used and no detection signal is output from the sensor 104, the entire regions may be designated as the unimportant regions. And if the regions A1 and A2 are not used and the detection signal is output from the sensor 104, the entire regions may be designated as the important regions.

FIG. 17 is a block diagram of another example of the configuration of a chief part of the image transmission system according to the fourth embodiment of the present invention. FIG. 17 depicts the transmission side unit Ut to which a plurality of monitoring cameras 101 and a plurality of sensors 104 are connected, and which includes an image compounding unit 105. This image compounding unit 105 compounds pieces of image data output from the plural monitoring cameras 101, generates new image data, and outputs the new image data to the YUV converter 10.

FIG. 18 is an example of the composite image. An image region is divided into four display regions B1 to B4, the monitoring cameras 101 are allocated to the respective display regions, and images picked up by the four monitoring cameras can be simultaneously displayed. The sensors 104 are provided to correspond to the respective monitoring cameras 101 by one-to-one correspondence. Each of the sensors 104 detects a moving object within the pickup range of the corresponding monitoring camera 101 or in its surroundings. The detection signal from each of the sensors 104 is input to the region designating unit 13, and the region designating unit 13 designates the important region based on the detection signal from the sensor 104.

Namely, if all the display regions are designated as the unimportant region and the detection signal is output from one of the sensors 104, the region designating unit 13 normally designates only the display regions B1, B2, B3 or B4 corresponding to the sensor 104 as the important regions. As another operation example, only one of the display regions B1 to B4 is always designated as the important region, and only one of the display regions B1 to B4 of the monitoring camera 101 corresponding to the sensor 104 that outputs the last detection signal may be designated as the important region.

BRIEF DESCRIPTION OF THE DRAWINGS

FIG. 1 is a block diagram of an example of a configuration of an image compression and expansion system according to a first embodiment of the present invention.
FIG. 2 is a block diagram of an example of a configuration of a transmission side unit Ut shown in FIG. 1.
FIG. 3 is a block diagram of an example of a configuration of a reception side unit Ur shown in FIG. 1.
FIG. 4 is a block diagram of an example of a configuration of an image compressor 11 shown in FIG. 2.
FIGS. 5(a) and 5(b) are photograph of an example of mosaicing.
FIG. 6 is an example of a quantization table T1.
FIG. 7 is a block diagram of an example of a configuration of a coding unit 143.
FIG. 8 is an example of a two-dimensional Huffman code table used for coding an AC coefficient string.
FIGS. 9(a) and 9(b) are examples of AC coefficient coding.
FIG. 10 is a block diagram of an example of a configuration of an image expander 21 shown in FIG. 3.
FIGS. 11(a) to 11(c) are photographs for comparative evaluation of an effect of the mosaicing according to the first embodiment.
FIGS. 12(a) and 12(b) are photographs for comparative evaluation of the effect of the mosaicing according to the first embodiment.
FIGS. 13(a) to 13(e) are an example of a relationship between a filtering region and a JPEG block.
FIG. 14 is a block diagram of an example of an image transmission system according to a third embodiment of the present invention.
FIG. 15 is a block diagram of an example of a configuration of chief part of an image transmission system according to a fourth embodiment of the present invention.
FIG. 16 shows image data viewed from a monitoring camera 101.
FIG. 17 is a block diagram of another example of the chief part of the image transmission system according to the fourth embodiment of the present invention.
FIG. 18 is an example of a composite image.

DESCRIPTION OF REFERENCE NUMERALS

11 Image compressor
12 Data transmitter
13 Region designating unit
15 Image output terminal
16 Mosaicing unit
17 JPEG encoder
21 Image expander
100, 110, 111 Communication line
101 Image input apparatus (monitoring camera)
102, 103 Image output apparatus
104 Sensor
130 Filtering region divider
131 Filtering unit
132 Lowpass filter
133 Output selector
140 Block divider
141 DCT processor
142 Quantizer
143 Coding unit
T1 Quantization table
T2 Code table
Ur Reception side unit
Ut Transmission side unit

The invention claimed is:

1. An image compression method comprising:
   a preprocessing step of performing preprocessing on input image data; and
   a data compressing step of performing a data compression processing on preprocessed image data, wherein
   said preprocessing step includes:
   a filtering region dividing step of dividing said input image data into a plurality of filtering regions being units for a filtering processing;
   a region designating step of discriminating important regions from unimportant regions in said input image data; and
   a filtering step of performing said filtering processing only on said unimportant regions for each of said filtering regions to attenuate a high frequency component of said input image data,
   said data compressing step includes:
   a block region dividing step of dividing said preprocessed image data into a plurality of block regions being units for an orthogonal transform, each shape of which is rectangular;
   an orthogonal transforming step of performing said orthogonal transform processing said image data for each of said block regions; and
   a quantizing step of quantizing said image data that has been subjected to said orthogonal transform processing for each of said block regions,
   wherein each of said filtering regions is a cluster which is included in and is smaller than said block region, and which is consisting of one or more adjacent rectangular regions, each of the rectangular regions being obtained by equally dividing each of said block regions by 2n (where n is a natural number) and each having a size of two or more pixels, and said filtering processing is performed using a low-pass filter common to said respective filtering regions.

2. An image compression apparatus comprising:
   preprocessing means for preprocessing input image data: and
   data compressing means for performing a data compression processing on preprocessed image data, wherein
   said preprocessing means includes:
   filtering region dividing means for dividing said input image data into a plurality of filtering regions being units for a filtering processing;
   region designating means for discriminating important regions from unimportant regions in said input image data; and
   filtering means for performing said filtering processing only on said unimportant regions for each of said filtering regions to attenuate the high frequency component of said input image data,
   said data compressing means includes:
   block region dividing means for dividing said preprocessed image data into the plurality of block regions being units for an orthogonal transform, each shape of which is rectangular;
   orthogonal transforming means for performing said orthogonal transform processing on said image data for each of said block regions; and
   quantizing means for quantizing said image data that has been subjected to said orthogonal transform processing for each of said block regions,
   wherein each of said filtering regions is a cluster which is included in and is smaller than said block region, and which is consisting of one or more adjacent rectangular regions, each of the rectangular regions being obtained by equally dividing each of said block regions by 2n (where n is a natural number) and each having a size of two or more pixels, and said filtering processing is performed using a low-pass filter common to said respective filtering regions.

3. The image compression apparatus according to claim 2, wherein
   said filtering means performs a unification processing for making pixel data within each of said filtering regions discriminated as said unimportant regions coincide with one another.

4. The image compression apparatus according to claim 2, wherein pickup image data picked up by a monitoring camera is input as said input image data, and said important regions and said unimportant regions are designated by an operator.

5. The image compression apparatus according to claim 2, wherein pickup image data picked up by a monitoring camera is input as said input image data, and said important regions and said unimportant regions are determined based on a detection signal from a moving body detection sensor.

6. The image compression apparatus according to claim 2, wherein said filtering region dividing means divides said input image data into said filtering regions of two or more types different in size.

7. The image compression apparatus according to claim 2, further comprising:
   an image data output terminal for outputting said preprocessed image data.

8. An image transmission system comprising:
   a preprocessing apparatus connected to a data compression apparatus through a first communication line, and
   a data expansion apparatus connected to said data compression apparatus through a second communication line, wherein
   said preprocessing apparatus includes:
   filtering region dividing means for dividing input image data into a plurality of filtering regions being units for a filtering processing;
   region designating means for discriminating important regions from unimportant regions in said input image data;
   filtering means for performing said filtering processing only on said unimportant regions for each of said filtering regions to attenuate a high frequency component of said input image data; and
   data transmission means for transmitting said image data that has been subjected to said filtering processing to said first communication line,
   said data compressing step includes:
   block region dividing means for dividing preprocessed image data into a plurality of block regions being units for an orthogonal transform, each shape of which is rectangular;
   orthogonal transforming means for performing said orthogonal transform processing on said image data for each of said block regions;
   quantizing means for quantizing said image data that has been subjected to said orthogonal transform processing for each of said block regions; and
   data transmitting means for transmitting encoded image data to said data expansion apparatus through said second communication line,
   wherein each of the filtering regions is a cluster which is included in and is smaller than said block region, and which is consisting of one or more adjacent rectangular regions, each of the rectangular regions being obtained by equally dividing each of said block regions by 2n (where n is a natural number) and each having a size of two or more pixels, and said filtering processing is performed using a low-pass filter common to said respective filtering regions.

9. The image transmission system according to claim 8, further comprising:
an image display apparatus that is connected to said first communication line, and that displays said preprocessed image data.

10. A data compression preprocessing apparatus for preprocessing image data input to a data compression apparatus that divides said image data into a plurality of rectangular block regions being units for an orthogonal transform, and that performs said orthogonal transform and a quantization on said input data for each of the block regions, the data compression preprocessing apparatus comprising:
a filtering region dividing step of dividing said input image data into a plurality of filtering regions being units for a filtering processing
region designating means for discriminating important regions from unimportant regions in said input image data; and
filtering means for performing said filtering processing only on said unimportant regions for each of said filtering regions to attenuate a high frequency component of said input image data,
wherein each of said filtering regions is a cluster which is included in and is smaller than said block region, and which is consisting of one or more adjacent rectangular regions, each of the rectangular regions being obtained by equally dividing each of said block regions by 2n (where n is a natural number) and each having a size of two or more pixels, and
said filtering processing is performed using a low-pass filter common to said respective filtering regions.

11. A non-transitory computer-readable medium having recorded thereon a computer program for preprocessing image data input to a data compression apparatus that divides said input image data into a plurality of block regions being rectangular units for an orthogonal transform, and that performs said orthogonal transform and a quantization on said input image data for each of said block regions, the computer program comprising procedures for executing:
a filtering region dividing step of dividing said input image data into a plurality of filtering regions being units for a filtering processing;
a region designating step of discriminating important regions from unimportant regions in said input image data; and
a filtering step of performing said filtering processing only on said unimportant regions for each of the filtering regions to attenuate a high frequency component of said input image data,
wherein each of said filtering regions is a cluster which is included in and is smaller than said block region, and which is consisting of one or more adjacent rectangular regions, each of the rectangular regions being obtained by equally dividing each of said block regions by 2n (where n is a natural number) and each having a size of two or more pixels, and
said filtering processing is performed using a low-pass filter common to said respective filtering regions.

12. The image compression apparatus according to claim 3, wherein said each of the rectangular regions is obtained by equally dividing each of said block regions by 2k in a vertical direction and by 2m in a horizontal direction where k and m are natural numbers.

13. The image compression apparatus according to claim 12, wherein a number of AC coefficients obtained by said orthogonal transform processing is suppressed to be equal to or smaller than k×m.

14. The image compression apparatus according to claim 3, wherein said each of the rectangular regions is obtained by equally dividing each of said block regions by 2k in a vertical direction where k is a natural number; and
a number of AC coefficients in the vertical direction obtained by said orthogonal transform processing is suppressed to be equal to or smaller than k.

15. The image compression apparatus according to claim 3, wherein said each of the rectangular regions is obtained by equally dividing each of said block regions by 2m in a horizontal direction where m is a natural number; and
a number of AC coefficients in the horizontal direction obtained by said orthogonal transform processing is suppressed to be equal to or smaller than m.

16. The image compression apparatus according to claim 2, wherein
said filtering means performs said filtering processing on said filtering regions including no important region and does not perform said filtering processing on said filtering regions including said important region.

17. The image compression apparatus according to claim 2, wherein
said each of the rectangular regions is obtained by equally dividing each of said block regions by 2 in a vertical direction or is obtained without dividing any of said block regions in a vertical direction.

18. The image compression apparatus according to claim 2, wherein
said each of the rectangular regions is obtained by equally dividing each of said block regions by 2 in a horizontal direction or is obtained without dividing any of said block regions in a horizontal direction.

* * * * *